United States Patent
Kim et al.

(10) Patent No.: US 7,116,409 B2
(45) Date of Patent: Oct. 3, 2006

(54) OPTICAL FIBER FOR HIGH-SPEED FIBER-DRAWING PROCESS AND COATING CONCENTRICITY MONITOR

(75) Inventors: Young-Seok Kim, Gumi-si (KR); Sung-Koog Oh, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/933,135

(22) Filed: Sep. 2, 2004

(65) Prior Publication Data
US 2005/0196115 A1 Sep. 8, 2005

(30) Foreign Application Priority Data
Mar. 3, 2004 (KR) .................. 10-2004-0014273

(51) Int. Cl.
*G01N 21/00* (2006.01)
(52) U.S. Cl. ............................................ 356/73.1
(58) Field of Classification Search ............... None
See application file for complete search history.

(56) References Cited

U.S. PATENT DOCUMENTS

| | | | | |
|---|---|---|---|---|
| 5,237,383 A | * | 8/1993 | Parisi ..................... 356/73.1 |
| 5,838,862 A | * | 11/1998 | Chien ..................... 385/102 |
| 6,596,394 B1 | * | 7/2003 | Toler et al. ............. 428/392 |
| 2002/0106173 A1 | * | 8/2002 | Stupak et al. ........... 385/128 |

* cited by examiner

*Primary Examiner*—Tu T. Nguyen
(74) *Attorney, Agent, or Firm*—Cha & Reiter, L.L.C.

(57) ABSTRACT

An optical fiber includes a core as a light signal transmission medium, a clad surrounding the core, a first coating layer which surrounds the clad and is formed of an UV-cured polymer material, and a second coating layer which surrounds the first coating layer and is formed of an UV-cured polymer material. The difference between the refraction index of the first coating layer and that of the second coating layer ranges from 0 (excluding 0) to 0.06.

19 Claims, 4 Drawing Sheets

OPTICAL FIBER FOR HIGH-SPEED FIBER-DRAWING PROCESS AND COATING CONCENTRICITY MONITOR

CLAIM OF PRIORITY

This application claims priority to an application entitled "OPTICAL FIBER FOR HIGH-SPEED FIBER-DRAWING PROCESS AND COATING CONCENTRICITY MONITOR," filed in the Korean Intellectual Property Office on Mar. 03, 2004 and assigned Serial No. 2004-14273, the contents of which are hereby incorporated by reference.

BACKGROUND OF THE INVENTION

1. Field of the Invention

The present invention relates to an optical fiber, and more particularly to a device for monitoring a coating concentricity of an optical fiber and an optical fiber suitable for the same device.

2. Description of the Related Art

In general, an optical fiber comprises a core as a light transmission medium, a clad surrounding the core, a first coating layer which surrounds the clad and is formed of a soft material having a relatively low modulus, and a second coating layer which surrounds the first coating layer and has a relatively high modulus. In other words, the optical fiber has a double-coating structure. A conventional fiber-drawing tower has a coating unit for forming the first and the second coating layers, a curing unit for curing the first and the second coating layers, and a coating concentricity monitor disposed between the coating unit and the curing unit. The coating concentricity monitor is used for monitoring optical fiber vibration and a coating concentricity error that can be generated while the optical fiber passes through the coating unit. The coating concentricity monitor irradiates a light to a double-coated optical fiber in order to obtain a pattern that appears on a light-receiving surface after the light has passed through the optical fiber. It is possible to know the coating concentricity of the double-coated optical fiber from the said pattern. Since an optical fiber preform tends to become larger in its diameter through technological developments in optical fiber production processes, a high-speed fiber-drawing process becomes more important for the purpose of reducing the manufacturing cost and increasing the unit productivity.

However, the more the fiber-drawing speed increases, the more the temperature of the fiber increases, and the temperature increased thereby causes a variation in the refraction index values of the first and the second coating layers of the optical fiber. As the fiber-drawing speed increases, it is possible to monitor an optical fiber vibration and a coating concentricity error within a certain range of refraction index variations. However, it is not possible to monitor them above the range, because an overlapping of the pattern appearing on the light-receiving surface is generated by the increase of the refraction angle of the light for monitoring.

It is accordingly desirable to provide a device for monitoring a coating concentricity in a high-speed fiber-drawing process.

SUMMARY OF THE INVENTION

The present invention has been made to solve the above-mentioned problems occurring in the prior art, and an object of the present invention is to provide an optical fiber that facilitates the monitoring of coating concentricity in a high-speed fiber-drawing process.

Another object of the present invention is to provide a coating concentricity monitor which can easily monitor coating concentricity of an optical fiber in a high-speed fiber-drawing process.

In order to accomplish this object, there is provided an optical fiber that includes a core as a light signal transmission medium, a clad surrounding the core, a first coating layer which surrounds the clad and is formed of an UV-cured polymer material, and a second coating layer which surrounds the first coating layer and is formed of an UV-cured polymer material. The difference between the refraction index of the first coating layer and that of the second coating layer ranges from 0 (excluding 0) to 0.06.

In accordance with another aspect of the present invention, there is provided a coating concentricity monitor that includes a light source such as a laser for generating a light for monitoring having a predetermined wavelength, and a beam splitter for carrying out power division of the light for monitoring to form a first split light and a second split light. The latter are emitted through respectively different paths. The monitor further includes a first reflector for reflecting the first split light to an optical fiber, a second reflector for reflecting the second split light to the optical fiber, a first light-receiving surface to show the pattern of the first split light that has passed through the optical fiber, and a second light-receiving surface to show the pattern of the second split light that has passed through the optical fiber.

BRIEF DESCRIPTION OF THE DRAWINGS

The above and other objects, features and advantages of the present invention will be more apparent from the following detailed description taken in conjunction with the accompanying drawings, in which the same elements are designated by the same reference numerals throughout the several views.

DETAILED DESCRIPTION

A preferred embodiment of the present invention is described below with reference to the accompanying drawings. Details of known functions and configurations incorporated herein are omitted for clarity of presentation.

Figure 1:
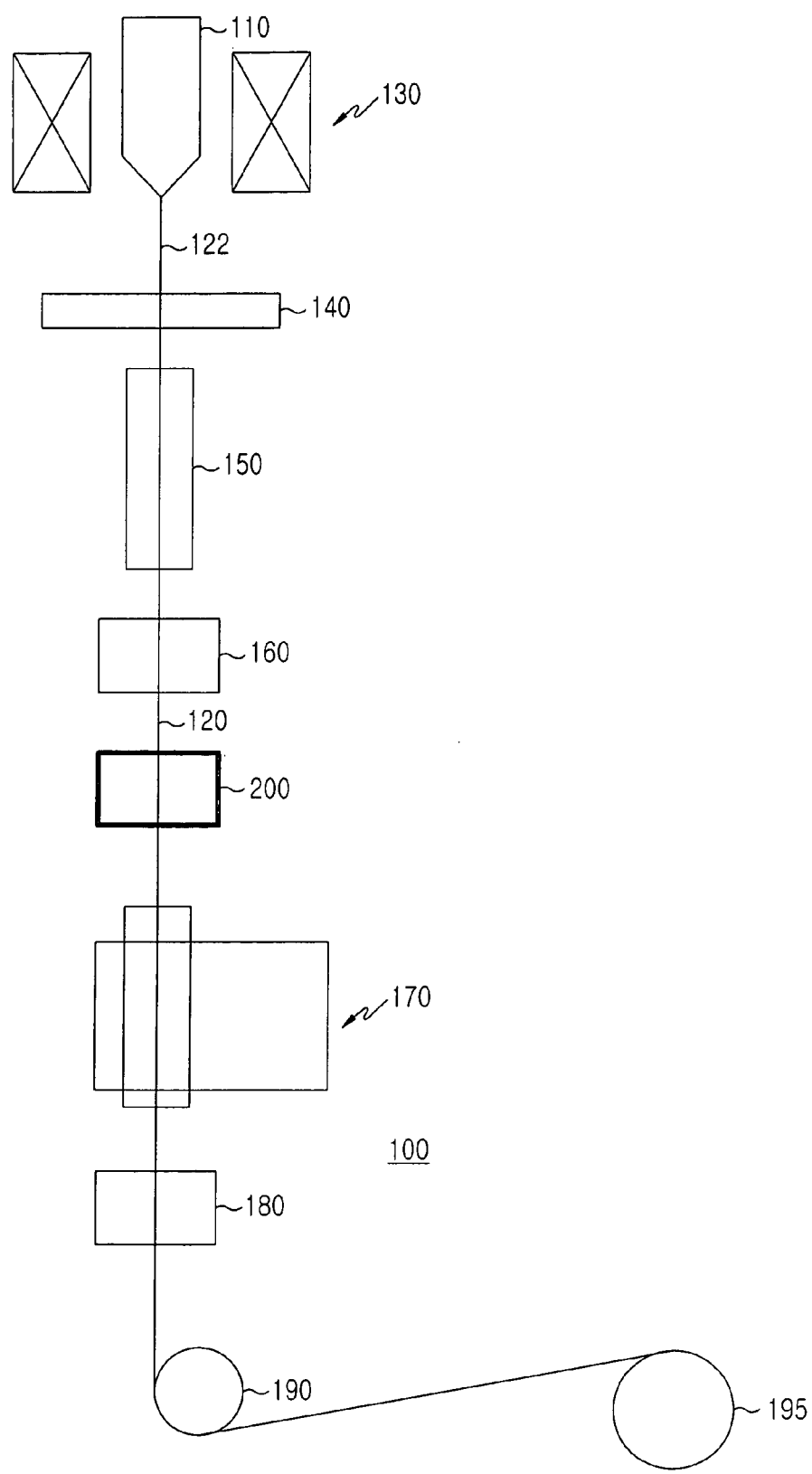
FIG. 1 is a schematic view of a fiber-drawing tower according to a preferred embodiment of the present invention.

FIG. 1 is a schematic view of a fiber-drawing tower 100 according to a preferred embodiment of the present invention. The fiber-drawing tower 100 includes a furnace 130, a fiber outer diameter-measuring unit 140, a fiber-cooling unit 150, a coating unit 160, a coating concentricity monitor 200, a curing unit 170, a coating outer diameter-measuring unit 180, a capstan 190 and a take-up 195.

The furnace 130 melts the ends of the optical fiber preform 110 inserted therein so as to draw a bare fiber 122 from the lower part of the furnace 130. Each of the optical fiber preform 110 and the bare fiber 122 is formed of a core as a light transmission medium and a clad surrounding the core.

The fiber outer diameter-measuring unit 140 measures the diameter of the bare fiber 122 drawn from the optical fiber preform 110. It is possible to control the tension applied to the bare fiber 122 so that the diameter of the bare fiber measured by the fiber outer diameter-measuring unit 140 can have a predetermined value.

Figure 3:
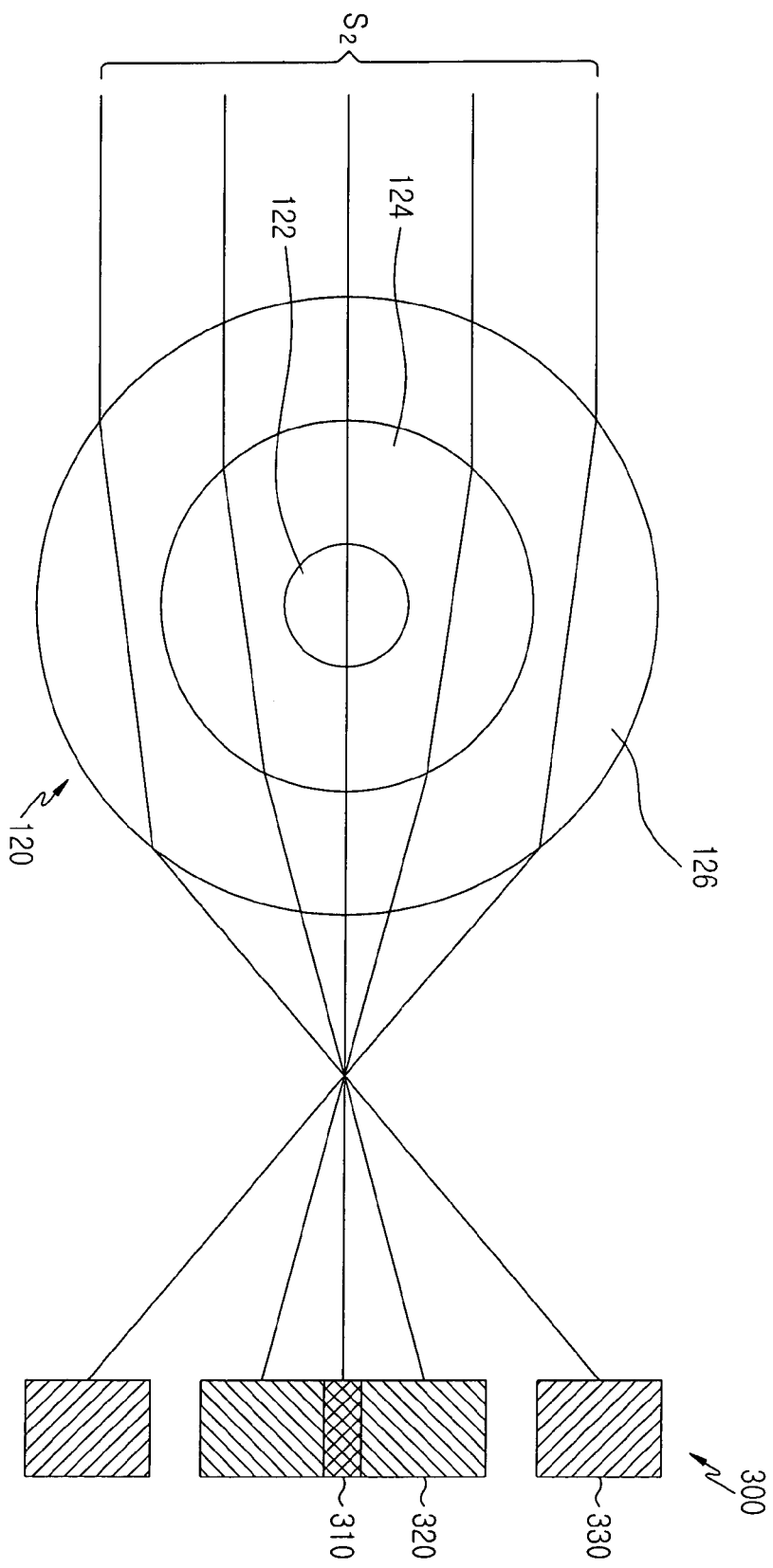
FIG. 3 is an illustrative view of a pattern of a first split light appearing i n a first light-receiving surface.

The fiber-cooling unit 150 reduces the temperature of the bare fiber 122 before it enters into the coating unit 160, thereby facilitating the coating of the bare fiber. The coating unit 160 forms, as shown in FIG. 3, a first coating layer 124 and a second coating layer 126 on the outer circumferential surface of the bare fiber 122. The first coating layer 124 surrounds the bare fiber 122 and is formed of a soft material having a relatively low modulus, while the second coating layer 126 surrounds the first coating layer 124 and has a relatively high modulus. The first coating layer 124 improves the bending property of the bare fiber 122, and preferably has high adhesive property and good stability over a wide range of temperatures. The second coating layer 126 protects the bare fiber 122 from outside impact and may serve to block external moisture from entering. For the purpose of forming the first and the second coating layers 124, 126, it is possible to use a "wet on wet" method in which the first and the second coating layers 124, 126 are formed at the same time, or a "wet on dry" method in which the first coating layer 124 is formed first and then the second coating layer 126 is formed thereon. Additionally, the first and the second coating layers 124, 126 are formed of an UV-cured polymer material that ensures a sufficient curing degree in a high-speed fiber-drawing process. The UV-cured polymer material includes, for example, an acrylate-based material, a vinyl-based material, or the like. Based on the values measured at room temperature or after curing, it is preferable that the difference between the refraction index of the first coating layer 124 and that of the second coating layer 126 is 0.06 or less so as to facilitate the coating concentricity monitoring even in a high-speed fiber-drawing process, and that the refraction index of the first coating layer is 1.48 or more.

The coating concentricity monitor 200 monitors the coating concentricity of the optical fiber 120. Coating concentricity error for the optical fiber 120, which markedly deteriorates the quality of the fiber, is generated mostly by vibration of the fiber in the coating unit 160. The curing unit 170 irradiates UV to the outer circumference of the optical fiber 120 to cure the first and the second coating layers 124, 126.

The coating outer diameter-measuring unit 180 measures the diameter of the optical fiber 120 that has passed through the curing unit 170.

The capstan 190 applies a certain tension to the optical fiber 120, so that the bare fiber 122 can be continuously drawn from the optical fiber preform 110 while maintaining a constant diameter. The capstan 190 controls the tension applied to the bare fiber 122 so that the diameter of the bare fiber 122 measured by the fiber outer diameter-measuring unit 140 can assume a predetermined value.

The take-up 195, which may be cylindrical spool, receives the optical fiber 120 wound on the outer circumferential surface thereof.

Figure 2:
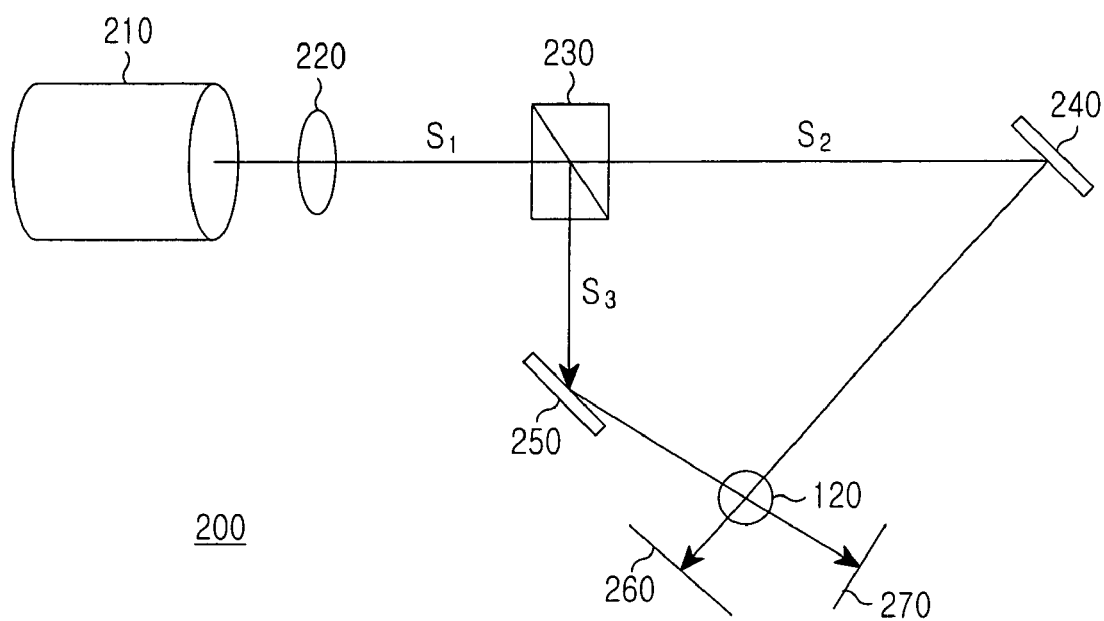
FIG. 2 is a detailed view of the coating concentricity monitor as shown in FIG. 1.

FIG. 2 is a detailed view of the coating concentricity monitor 200 which includes a laser 210, a lens 220, a beam splitter 230, first and a second reflectors 240, 250 each of which may include a mirror, and first and a second light-receiving surfaces 260, 270.

The laser 210 generates a light for monitoring $S_1$, wherein the wavelength of the light for monitoring $S_1$ is 633 nm or less in order to increase the resolution of the coating concentricity monitor 200, and thus to facilitate the monitoring of coating concentricity even in a high-speed drawing of the optical fiber 120. The laser 210 may include, for example, a helium-neon laser (He—Ne laser), a laser diode, or the like.

The lens 220 converges the light for monitoring $S_1$. The lens 220 may include a convex lens, an aspherical lens, etc., performing a light-converging function.

The beam splitter 230 carries out power division of the incident light, and emits first and the second split lights $S_2$, $S_3$ along mutually different respective paths.

The first and second reflectors 240, 250 reflect, respectively, the first and second split light $S_2$, $S_3$ to the optical fiber 120.

As seen in the example shown in FIG. 3, a pattern 300 of the first split light $S_2$ that has passed through the optical fiber 120 appears on a first light-receiving surface 260. Similarly, and as seen in FIG. 2, the pattern of the second split light $S_3$ that has passed through the optical fiber 120 appears on the second light-receiving surface 270. The first and the second light-receiving surfaces 260, 270 may include a light-receiving surface of a screen, a CCD (Charged Coupled Device), etc., respectively. Thus, for instance, the pattern 300 can be directly observed by the naked eye or can be observed by means of a monitor connected to a CCD. The optical fiber 120 may, for example, be parallel to the z-axis, with the first light-receiving surface 260 being normal (i.e., perpendicular) to the x-axis, and the second light-receiving surface 270 being normal to the y-axis, so that the coating concentricity monitor 200 monitors the coating concentricity of the optical fiber in three-dimensions. When the wavelength of the light for monitoring $S_1$ is too long, zones of the pattern 300 appearing on the first or second light-receiving surface 260, 270 may overlap due to the temperature increase followed by the increase of a refraction angle. In particular and by way of example, the first, second and third zones 310, 320, 330 forming the pattern 300 may overlap one another, thereby disturbing the monitoring. Accordingly, the wavelength of the light for monitoring $S_1$ is preferably set to 633 nm or less, so that an efficient refraction angle can be ensured, and thus the coating concentricity can be monitored even in a high-speed drawing of the optical fiber 120.

In FIG. 3, the pattern 300 of the first split light $S_2$ includes the first, second and third zones 310, 320, 330, the first zone 310 being located in the center, the second zone 320 residing in immediate adjacency on both sides of the first zone 310, and the third zone 330 residing at both sides of, and spaced apart from, the second zone 320. When the optical fiber 120 has no coating concentricity error, the pattern 300 of the first split light $S_2$ shows a symmetric shape from side to side, with the first zone 310 being taken as the center. However, when a coating concentricity error of the optical fiber 120 is present, the shape of the pattern 300 of the first split light $S_2$ is asymmetric from side to side, the first zone 310 being taken as the center.

Figure 4:
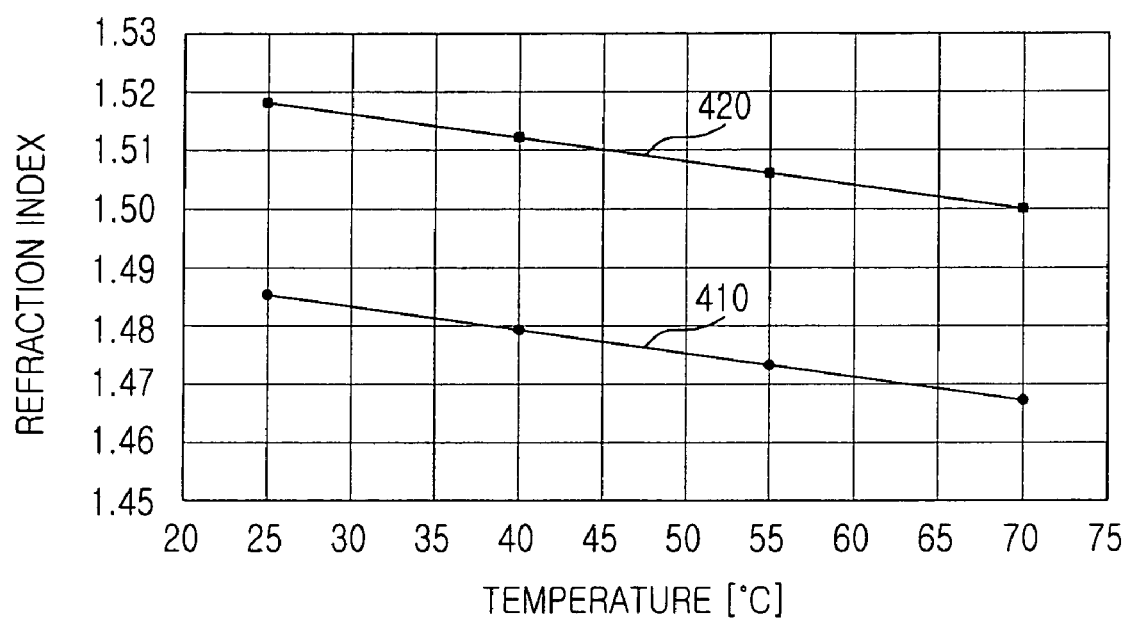
FIG. 4 is a graph showing refraction index curves of a first and a second coating layers in liquid state.

FIG. 4 is a graph showing refraction index curves of first and a second coating layers in liquid state. The first curve 410 plots change of refraction index versus temperature for the first coating layer 124 in liquid state, and the second curve 420 plots change of refraction index versus temperature for the second coating layer 126 in liquid state. It can be seen that each of the refraction index values of the first and the second coating layers 124, 126 in liquid state gradually decreases in proportion to the temperature increase.

Because the first coating layer 124 is closely contacted to the bare fiber 122 and the second coating layer 126 is spaced apart from the bare fiber 122, the temperature of the first coating layer 124 and that of the second coating layer 126 are different from each other. Therefore, the refraction index of the first coating layer 124 and that of the second coating layer 126 are different from each other, that difference becoming larger in the case of a high-speed fiber drawing. The increase in that difference increases the refraction angle of the light for monitoring, thereby causing the pattern zones to overlap. This overlapping, in turn, interferes with the coating concentricity monitoring. Accordingly, based on the values measured at room temperature or after curing, it is preferable that the difference between the refraction index of the first coating layer 124 and that of the second coating layer 126 is 0.06 or less and that the refraction index of the first coating layer 124 is 1.48 or more. In this way, an efficient refraction angle can be ensured, and the coating concentricity can be monitored even if the optical fiber 120 is drawn at high-speed.

As described above, the present invention controls refraction index in the first and the second coating layers, respectively, efficient refraction angle is ensured to enable coating concentricity monitoring even in a high-speed fiber-drawing process.

In addition, control of the wavelength of the light for monitoring provides an efficient refraction angle to likewise enable coating concentricity monitoring in a high-speed fiber-drawing process.

While the invention has been shown and described with reference to a preferred embodiment thereof, it will be understood by those skilled in the art that various changes in form and details may be made therein without departing from the spirit and scope of the invention as defined by the appended claims.

What is claimed is:

1. An optical fiber comprising:
a core as a light signal transmission medium;
a clad surrounding the core;
a first coating layer having a first modulus which surrounds the clad and is formed of an UV-cured polymer material; and
a second coating layer having a second modulus which surrounds the first coating layer and is formed of an UV-cured polymer material, wherein a difference between the refraction index of the first coating layer and that of the second coating layer is non-zero and ranges from 0 to 0.06, and wherein the value of the second modulus value is higher than the first second modulus.

2. The optical fiber as claimed in claim 1, wherein the first coating layer has a refraction index of at least 1.48.

3. The optical fiber as claimed in claim 1, wherein the UV-cured polymer material includes at least one of an acrylate-based material and a vinyl-based material.

4. A coating concentricity monitor comprising:
a light source for generating a light for monitoring having a predetermined wavelength;
a beam splitter for carrying out power division of the generated light for monitoring to form a first split light and a second split light and emitting them along respectively different paths;
a first reflector disposed for reflecting the first split light to an optical fiber where said optical fiber comprising:
a core as a light signal transmission medium, a clad surrounding the core, a first coating layer having a first modulus which surrounds the clad and is formed of an UV-cured polymer material; and a second coating layer having a second modulus which surrounds the first coating layer and is formed of an UV-cured polymer material, wherein a difference between the refraction index of the first coating layer and that of the second coating layer is non-zero and ranges from 0 to 0.06, and wherein the value of the second modulus value is higher than the first second modulus;
a second reflector disposed for reflecting the second split light to the optical fiber;
a first light-receiving surface to show a pattern of the first split light that has passed through the optical fiber; and
a second light-receiving surface to show a pattern of the second split light that has passed through the optical fiber.

5. The coating concentricity monitor as claimed in claim 4, wherein the light for monitoring has a wavelength of 633 nm or less.

6. The coating concentricity monitor as claimed in claim 4, wherein the coating concentricity monitor further comprises a lens for converging the light for monitoring.

7. The coating concentricity monitor as claimed in claim 4, wherein the generated light comprises coherent light.

8. The coating concentricity monitor as claimed in claim 4, wherein the light source comprises a laser.

9. The coating concentricity monitor as claimed in claim 4, wherein the first light receiving surface is disposed to receive from the optical fiber the reflected first split light.

10. The coating concentricity monitor as claimed in claim 9, wherein the second light receiving surface is disposed to receive from the optical fiber the reflected second split light.

11. The coating concentricity monitor as claimed in claim 10, wherein said reflected first split light being received follows a path orthogonal to that followed by said reflected second split light being received.

12. The coating concentricity monitor as claimed in claim 11, wherein the orthogonal paths are each orthogonal to a longitudinal direction of the optical fiber.

13. The coating concentricity monitor as claimed in claim 4, wherein the first and second light receiving surfaces comprise a screen.

14. The coating concentricity monitor as claimed in claim 4, wherein the first and second light receiving surfaces comprise a charge-coupled device (CCD).

15. The system as claimed in claim 4, wherein the first coating layer has a refraction index of at least 1.48.

16. The system as claimed in claim 4, wherein the UV-cured polymer material includes at least one of an acrylate-based material and a vinyl-based material.

17. The system as claimed in claim 4, wherein the generated light comprises coherent light.

18. The system as claimed in claim 4, wherein the light source comprises a laser.

19. The system as claimed in claim 4, wherein the first light receiving surface is disposed to receive from the optical fiber the reflected first split light, and wherein the second light receiving surface is disposed to receive from the optical fiber the reflected second split light.

* * * * *